Dec. 24, 1935.  H. D. TAYLOR  2,025,135
BRAKE MECHANISM
Filed Feb. 6, 1930   2 Sheets-Sheet 2
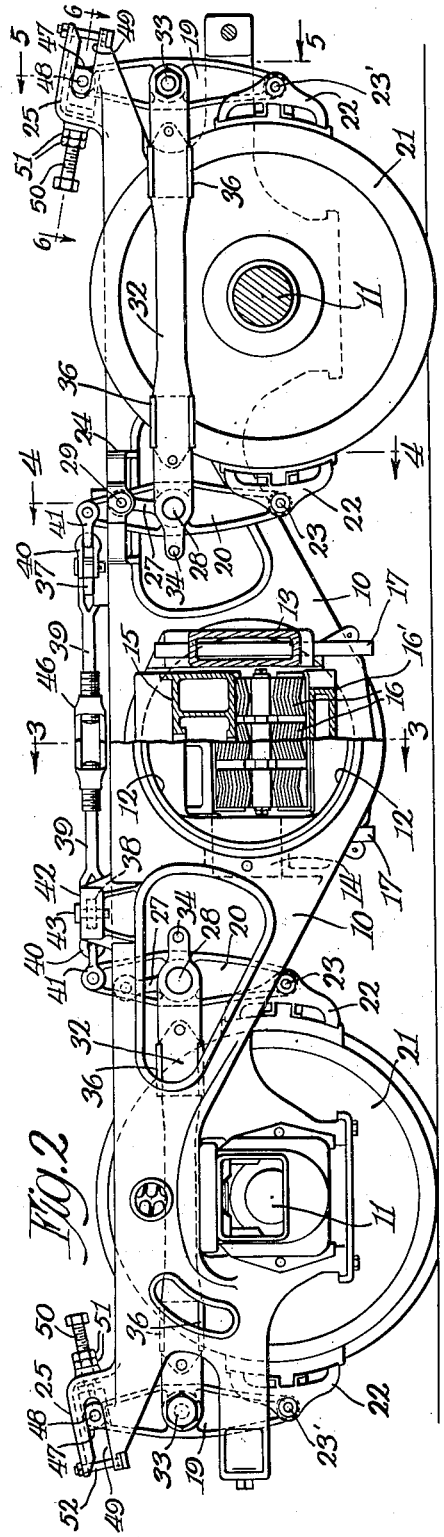
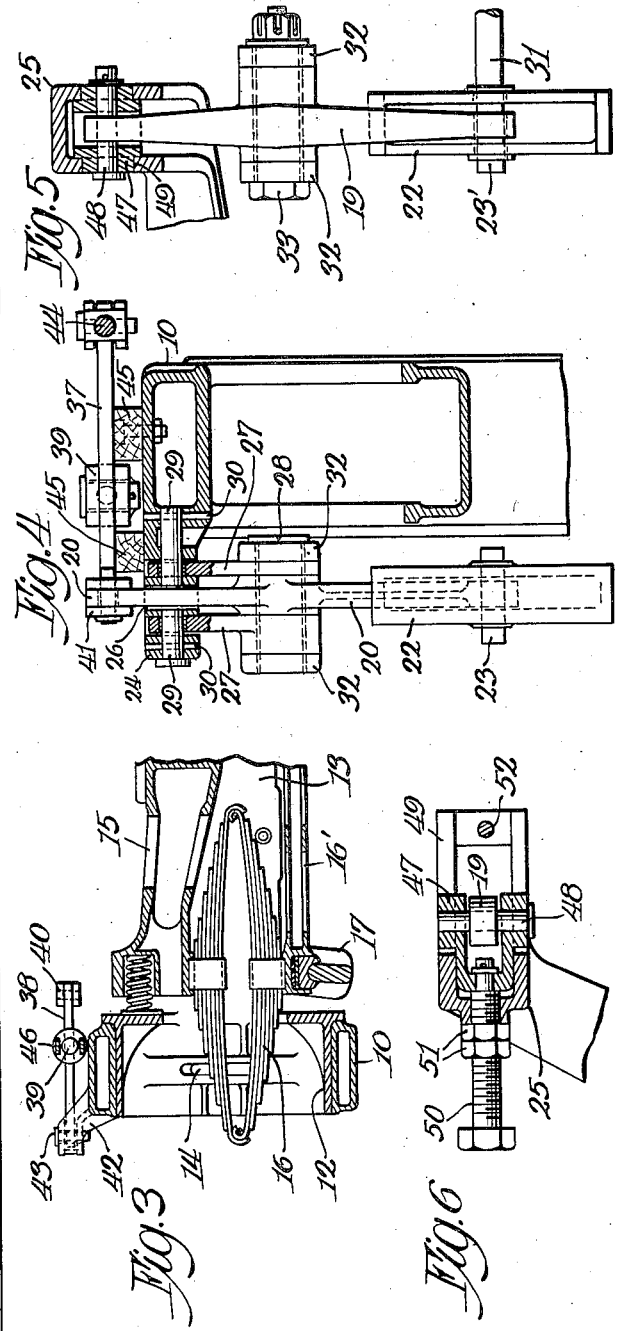
Inventor
Howard D. Taylor
By Fisher, Clapp, Soans & Pond
Attys.

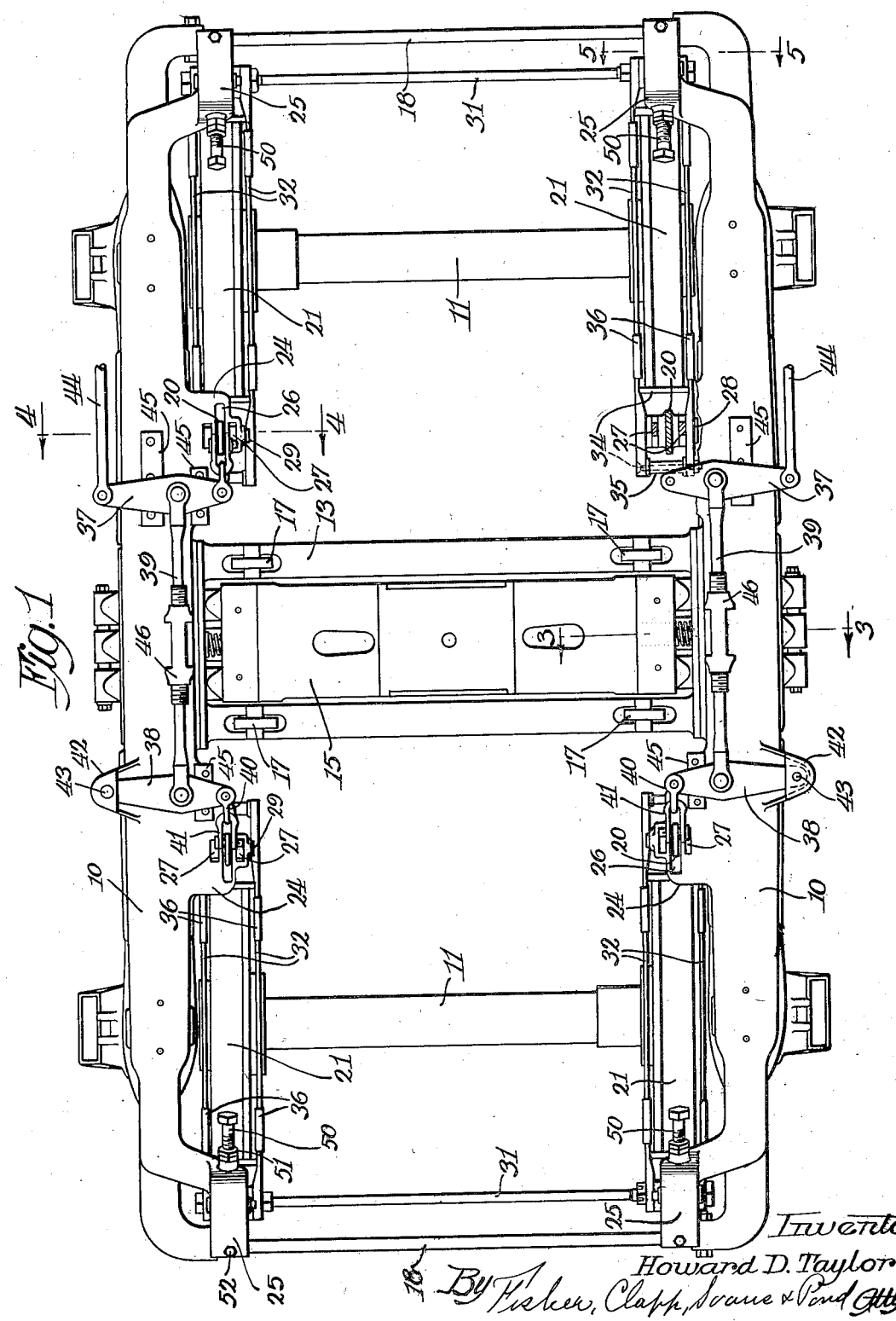

Patented Dec. 24, 1935

2,025,135

UNITED STATES PATENT OFFICE 2,025,135

BRAKE MECHANISM

Howard D. Taylor, New York, N. Y., assignor to Flexible Truck Corporation, Reading, Pa., a corporation of Delaware Application February 6, 1930, Serial No. 426,278

7 Claims. (Cl. 188—56)

The invention relates to brake mechanism for railway vehicles, and more particularly to the clasp type of brake mechanism and to the application thereof to motor trucks.

The invention seeks to provide an improved, effective brake mechanism consisting of few parts and which does not obstruct the space between the car wheels, so that ample room is afforded for electric motors, gearing and the like.

The invention consists in the features of improvement hereinafter set forth, illustrated in the accompanying drawings, and more particularly pointed out in the appended claims.

In the drawings:

Fig. 1 is a plan view of a car truck provided with the improved brake mechanism.

Fig. 2 is a view partially in elevation and partially in longitudinal section.

Figs. 3, 4 and 5 are detail sections on the lines 3—3, 4—4 and 5—5 respectively of Figs. 1 and 2, and Fig. 6 is a detail section on the line 6—6 of Fig. 2.

While applicable to other types, the present improved brake rigging is shown applied to and is particularly adapted for a four-wheeled car truck having means for permitting the limited vertical swinging movement of the truck side frames relatively to the transverse connecting member or transom. As shown, the side frames 10 are provided at their ends with pedestal yokes for engaging the journal boxes of the wheel axles 11. The enlarged central portions of the side frames are provided with central bearing openings for receiving end journals 12 of the truck transom 13. Keys 14 fixed to the side frames engage slots in the side walls of the transom journals to connect the parts in a manner permitting the limited swinging movement of the side frames in passing over irregularities in the track. A bolster 15 and bolster spring 16 are interposed between the side walls of the transom and together with a spring plank 16' are supported by means of hangers 17 carried by the transom. Rods 18 connect the side frames at their ends.

The improved brake rigging, in its preferred embodiment, is of the clasp type and comprises pairs of opposed brake levers 19 and 20, one pair for each wheel 21. The brake levers 19 and 20 also serve as hangers for the brake heads 22, so that the need for brake beams and additional hangers for supporting the brake heads is avoided. To this end, the brake levers are supported in planes of the wheels and, in the preferred form shown, their lower ends extend between ribs on the brake heads and are connected thereto by pivot pins 23 and 23'.

To support the brake levers in the planes of the wheels, the side frames 10 of the car truck are provided intermediate their central and end portions and at their upper edges with inwardly projecting brackets or lugs 24, and at their upper end portions with inwardly and upwardly offset projections or brackets 25, and means carried by these brackets support the outer and inner brake levers 19 and 20 of each pair in the plane of the wheels. The side frames are preferably formed of cast steel and the brackets or projections 24 and 25 are cast integral with the side frames.

The upper end of the lever 20 at the inner side of each wheel extends through a longitudinal slot 26 in the bracket or lug 24, and a hanger for supporting each inner lever 20 comprises a pair of relatively short links 27 (see Fig. 4) which are disposed on opposite sides of the associated lever 20, are pivoted at their upper ends to the bracket 24 and at their lower ends engage a pivot pin 28 which extends through the lever 20 intermediate its ends. The upper ends of the hanger links 27 extend within slots in the bracket 24, are connected thereto by pivot pins 29 and the latter are secured in place by pins 30.

The inner bracket levers 20 are thus supported and held against lateral displacement, but are free to swing longitudinally of the truck in applying and releasing the brakes. The outer brake levers 19 are fulcrumed at their upper ends on the side frame brackets or lugs 25 and are held against undue lateral movement by spacing bars 31 which extend between the lower ends of the brake levers 19 at each end of the truck, and the ends of which form the pivots 23' by which the lower ends of the outer brake levers are connected to the brake heads.

Each pair of brake levers are connected intermediate their ends by an operating member which is in the form of a pair of spaced bars 32. These bars are disposed on opposite sides of the intermediate wheel 21 and above the wheel and axle and are connected to the inner brake lever 20 by the pivot pin 28, and to the outer brake lever by a pivot pin 33. These bars are also provided with connecting bolts 34 and a spacer 35, the latter being interposed between extensions on the inner ends of the bars, and also with rubbing plates 36 adjacent the periphery of the wheel.

The connections between the pairs of brake levers at each side of the truck comprise a pair of horizontal truck levers 37 and 38 which are connected by an intermediate tension rod or pull-bar 39, and which is pivotally connected to the levers intermediate their ends. The inner ends of the horizontal levers 37 are each connected by a pair of interengaging clevises 40 and 41 to the upper end of the adjacent inner brake lever 20. The outer end of the lever 38 extends within a pocket in a lug 42 integral with the truck side frame and is connected thereto by a fixed pivot pin or fulcrum 43. The outer end of the lever 37 is adapted to be connected by a pullbar 44 to means, such as the brake cylinder for applying the brakes. The levers 37 at opposite sides of the truck could be connected by the pull-bars or rods 44 to an equalizing radius bar on the car truck, but preferably the brake cylinder and equalizer will be mounted on the frame of the car.

The improved brake rigging is of simple, effective construction, comprises few parts and occupies practically none of the space between the truck wheels. The spaced pull-bars 32 which are disposed on opposite sides of the wheels are relatively thin and flat and are disposed on edge. It is also noted that the brake rigging at each side is carried entirely upon an adjacent side frame, and hence is in no way affected by the swinging movement of the side frame relative to the truck transom. It is also noted that the connections between the brake levers are above the wheel axles so that the latter can be removed from the truck without taking down the brake rigging. The only weight imposed upon the horizontal truck levers 37 is that of the connecting rod 39, but to relieve the slight friction these levers preferably rest upon wooden blocks 45 fixed upon the upper faces of the side frames.

Means are provided for adjusting the brake rigging to take care of the reduced size of the wheels as the latter are ground down, and to this end means are provided for adjusting the upper ends of the brake levers. The inner brake levers are adjusted by providing means for varying the length of the tension rod 39 and preferably, as shown, this rod is formed of two sections connected by a turnbuckle 46. The outer brake levers 19 are adjusted in position by providing an adjustable fulcrum block 47 for the upper end of each lever. This block is U-shaped in horizontal section so as to embrace the upper end of the lever 19, and is connected thereto by a pivot pin 48. Projections on the sides of the block engage guideways 49 formed in the inner and outer sides of the bracket or lug 25, and an adjusting bolt 50 threaded through the inner end of the bracket is swivelled to the fulcrum block and serves to adjust its position in the guideways. As shown, the adjusting bolt 50 is provided with lock nuts 51 and a bolt 52 spans the open outer end of the bracket to avoid accidental disengagement of the brake lever therefrom. By the means described, the brake rigging can be readily adjusted to take care of any reduction in the size of the wheels.

Changes may be made in the details set forth without departure from the scope of the invention as defined in the claims.

I claim as my invention:

1. In clasp brake mechanism, the combination with the truck side frame and a supporting wheel, of a pair of opposed levers in the plane of the wheel, brake heads pivotally supported on the lower ends of the levers, a pair of hanger links and a pair of longitudinally extending, spaced bars having a common pivotal connection with one of said levers intermediate its ends, said bars extending on opposite sides of the wheel and above the wheel axle and being pivotally connected to the other lever intermediate its ends, the latter lever being pivotally supported at its upper end on the side frame, said hanger supported lever extending above its supporting hangers and above the side frame, and operating means extending over and supported on the side frame and connected to the upper end of the hanger supported lever.

2. In combination in clasp brake mechanism, a side frame, supporting wheels therefor, a pair of opposed brake levers disposed in the plane of each wheel, brake heads supported on the lower ends of the levers, bars connecting each pair of levers and pivoted thereto intermediate their ends and disposed above the wheel axle, fulcrum supports for the upper ends of the outer brake levers, hangers for supporting the inner brake levers, horizontal truck levers disposed above the side frame, connected together intermediate their ends and connected at their inner ends to the upper ends of the inner brake levers, one of said truck levers being fulcrumed at its outer end on the side frame, and an operating rod connected to the outer end of the other truck lever, substantially as described.

3. In combination in clasp brake mechanism, a truck side frame, supporting wheels therefor, a pair of opposed brake levers in the plane of each wheel, brake heads pivotally supported on the lower ends of said levers, fulcrum supports on the frame for the outer brake levers, hangers for supporting the inner levers, the latter extending above said hangers and above the side frame, a pair of spaced bars connecting each pair of brake levers and pivoted thereto intermediate their ends, each pair of said bars being disposed on opposite sides of the associated wheel and above its axle, horizontal truck levers disposed above and supported on the side frame and connected at their inner ends to the upper ends of the inner brake levers, and a tension rod connected to said truck levers intermediate their ends, the outer end of one of said truck levers being pivoted to the truck frame and the other lever adapted to be connected at its outer end to the brake actuating means.

4. In combination in clasp brake mechanism, a truck side frame, supporting wheels therefor, a pair of opposed brake levers in the plane of each wheel, brake heads pivotally supported on the lower ends of said levers, fulcrum supports on the frame for the outer brake levers, hangers for supporting the inner levers, a pair of spaced bars connecting each pair of brake levers and pivoted thereto intermediate their ends, each pair of said bars being disposed on opposite sides of the associated wheel and above its axle, horizontal truck levers disposed over the side frame and connected at their inner ends to the upper ends of the inner brake levers, a tension rod connecting said truck levers intermediate their ends, one of the latter being pivoted at its outer end to the side frame and the other adapted to be connected at its outer end to the brake actuating means, and means for adjusting said fulcrum supports and the effective length of said tension rod.

5. The combination with the truck side frame and a supporting wheel therefor, of a pair of upright opposed brake levers disposed in the plane of the wheel, brake heads supported on the lower ends of the levers, a pull bar pivoted to the levers intermediate their ends and extending above the wheel axle, one of the levers being fulcrumed at its upper end on the side frame, pivoted hangers supporting the other brake lever, the latter lever extending above the upper ends of said hangers and above the side frame and operating means extending over and supported on the side frame and connected to the upper end of the hanger supported lever, substantially as described.

6. In combination, a car truck side frame having an inwardly offset bracket adjacent its upper edge, a pair of depending hanger links pivoted on said bracket, a brake lever supported by the hanger links and extending upwardly through and above said bracket, and a horizontally disposed operating lever connected to the upper end of the brake lever.

7. In combination, a car truck side frame having inwardly offset brackets at its upper edge, a supporting wheel, a pair of opposed connected brake levers, a fulcrum and a pair of depending hanger links on said brackets respectively supporting the brake levers in the plane of the wheel, the hanger supported lever extending upwardly between the hanger links and through and above the associated bracket, and a horizontally disposed operating lever connected to the upper end of the hanger-supported brake lever.

HOWARD D. TAYLOR.